US008814699B1

(12) United States Patent
Daniel

(10) Patent No.: US 8,814,699 B1
(45) Date of Patent: Aug. 26, 2014

(54) SOCIAL NETWORKING ROULETTE GAME SYSTEM AND METHOD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 16 days.

(21) Appl. No.: 13/632,939

(22) Filed: Oct. 1, 2012

Related U.S. Application Data

(63) Continuation-in-part of application No. 13/621,781, filed on Sep. 17, 2012.

(60) Provisional application No. 61/540,909, filed on Sep. 29, 2011.

(51) Int. Cl.
*A63F 13/00* (2014.01)

(52) U.S. Cl.
USPC ........ 463/42; 463/9; 463/10; 463/16; 463/17; 463/22; 463/25; 463/39; 463/40; 463/41; 463/43

(58) Field of Classification Search
CPC . A63F 13/10; A63F 13/12; A63F 2300/8064; G06Q 30/02
USPC .................... 463/9, 10, 16, 17, 22, 25, 39–43
See application file for complete search history.

(56) References Cited

U.S. PATENT DOCUMENTS

| | | | | |
|---|---|---|---|---|
| 7,543,819 | B2 * | 6/2009 | Cox | 273/292 |
| 8,028,022 | B2 * | 9/2011 | Brownholtz et al. | 709/204 |
| 8,082,499 | B2 * | 12/2011 | Hudson et al. | 715/702 |
| 2002/0198053 | A1 * | 12/2002 | Yamaoka et al. | 463/42 |
| 2006/0271959 | A1 * | 11/2006 | Jacoby et al. | 725/46 |
| 2008/0207318 | A1 * | 8/2008 | Bailey et al. | 463/31 |
| 2008/0209351 | A1 * | 8/2008 | Macadaan et al. | 715/762 |
| 2010/0203963 | A1 * | 8/2010 | Allen et al. | 463/30 |
| 2011/0069661 | A1 * | 3/2011 | Waytena et al. | 370/328 |
| 2012/0088561 | A1 * | 4/2012 | Hohmann et al. | 463/1 |

* cited by examiner

*Primary Examiner* — Sunit Pandya
(74) *Attorney, Agent, or Firm* — Carol N. Green, Esq.

(57) ABSTRACT

A social networking roulette game system that comprises of at least one processor; and computer executable instruction code readable by the at least one processor and configured for displaying at least one game on a display device, wherein the game comprises of: randomly selecting a predefined sampling of friends from at least one online social networking contacts; displaying the predefined sampling of friends in a dynamic arrangement; animating the dynamic arrangement for selecting at least one friend of the predefined sampling of friends; reviewing a profile of the selected at least one friend; generating a random question based on the at least one friend's profile; requiring that a response be submitted for the random question; and awarding virtual currency to the gamer based on the gamer's response to the random question.

23 Claims, 5 Drawing Sheets

SOCIAL NETWORKING ROULETTE GAME SYSTEM AND METHOD

PRIORITY CLAIM

The present application claims priority to, and is a Continuation in Part of U.S. Provisional Patent Application Ser. No. 61/535,516, titled "Social Networking Game System," filed on Sep. 16, 2011; U.S. Provisional Patent Application Ser. No. 61/540,909 titled "Social Networking Game System And Method Querying Social Networking Member's Knowledge," filed on Sep. 29, 2011; and U.S. Non-Provisional patent application Ser. No. 13/621,781 titled "Social Networking Game System And Method," filed on Sep. 17, 2012. The entire disclosures of these patent applications are incorporated herein by reference as if fully restated herein.

FIELD

The present disclosure relates generally to computer and video games, and more specifically to games played on online social networking websites and applications.

BACKGROUND

Social networking websites, such as JUSTSYNC.com, allow gamers to connect with their contacts, which includes friends, family, and co-workers using technology. Gamers can keep up with each other's lives, send each other messages, post on each other's profiles, and play games with each other. There is an ever-increasing need for websites to make social networking more entertaining, as gamers grow tired of traditional social networking activities. Consequently, social networking games, such as FARMVILLE, MAFIA WARS, and the like have come about, adding an extra dimension to the social networking experience, however the demand for new and entertaining games is growing strongly.

A common issue with social networking websites is that many people have so many contacts, that they forget who their contacts are and sometimes they accept contact requests for people they do not know. A game has attempted to capitalize on this phenomenon for entertainment purposes, namely "How Many Friends Do You Know," which can be found at: http://howmanyfriendsdoyouknow.appspot.com/. This game consists of showing gamers a single picture of a friend at a time, and requiring that the gamer identify the friend by typing in the friend's exact name within a certain period of time.

This game is flawed, however, because rarely do gamers know both first and last names of their friends, let alone the exact spelling of both names. Furthermore, having to type in friends' names is cumbersome, and does not lend itself well to a dynamic fun online game. Thus, it would be helpful for friends to learn more about their friends in a fun, memorable way without their friends learning of their ignorance. The system and methods described herein satisfies these long felt needs in a new and novel manner.

SUMMARY OF PREFERRED EMBODIMENTS

The various embodiments of systems and methods disclosed herein result from the realization that the online social networking experience can be made more entertaining and engaging by providing an online interactive social networking roulette game that allows gamers to test their knowledge of their friends from their online social networking contacts list.

System and method comprises of: at least one processor; and computer executable instruction code readable by the at least one processor and configured for displaying at least one game on a display device, wherein the game comprises of computer executable instruction code readable by the at least one processor and configured for: randomly selecting a predefined sampling of friends from at least one online social networking contacts; displaying the predefined sampling of friends in a dynamic arrangement; animating the dynamic arrangement for selecting at least one friend of the predefined sampling of friends; reviewing a profile of the selected at least one friend; generating a random question based on the at least one friend's profile; requiring that a response be submitted for the random question; and awarding virtual currency to the gamer based on the gamer's response to the random question.

The at least one processor resides in a client computer, server computer, or on a cloud computer and may be electronically connected directly or indirectly to the display device, which may comprise of at least one client display device.

Dynamic arrangement may include any one or more of the following: a virtual wheel barrel, a rotating circumferential arrangement, a dynamic matrix, or a pop-up arrangement. In the preferred embodiment, the dynamic arrangement is a virtual wheel barrel. As such, the computer executable instruction code animates the dynamic arrangement by animating the virtual wheel barrel to virtually rotate and display the random question generated concerning the selected at least one friend. The random question and or the response may be displayed in any one or more formats: multiple choice, fill in, audio, text, or graphical format.

The computer executable instruction code readable by the at least one processor are further configured for receiving the response to the random question from an input device which may include any one of the following: a touchscreen, a mouse, a stylus, or a gesture recognition device. Depending on the response to the random question, the computer executable instruction code are further configured for deducting or crediting virtual currency to the gamer for incorrectly or correctly answering the random question.

In some embodiments method comprises of using at least one processor that comprises of computer executable instruction code executable by the at least one processor to perform any or all of the following: requiring that an input device is used to initiate a game which makes a random selection of at least one friend from a predefined random sampling of friends; and requiring that the input device is used to respond to a random question; and displaying at least one game on at least one display device wherein the game comprises of computer executable instruction code executable by the at least one processor and is configured for: randomly selecting the predefined sampling of friends from an online social networking contacts; displaying the predefined sampling of friends in a dynamic arrangement; animating the dynamic arrangement for selecting at least one friend of the predefined sampling of friends; reviewing a profile of the selected at least one friend; generating the random question based on the at least one friend's profile; requiring that a response be submitted for the random question; and awarding virtual currency to the gamer based on the gamer's response to the random question.

In yet another embodiment, method comprises of using an input device for initiating at least one game that comprises of computer executable instruction code executable by a computer processor, and configured for: randomly selecting a predefined sampling of friends from at least one online social networking contacts; displaying the predefined sampling of friends; animating the dynamic arrangement for selecting at least one friend of the predefined sampling of friends; as well as requiring that a response be submitted for the random question for which an award of virtual currency is awarded to the gamer based on a response to the random question; and using the input device to respond to the random question based on a profile of at least one friend selected from the predefined sampling of friends.

DETAILED DESCRIPTION OF PREFERRED EMBODIMENTS

Systems

Figure 1A:
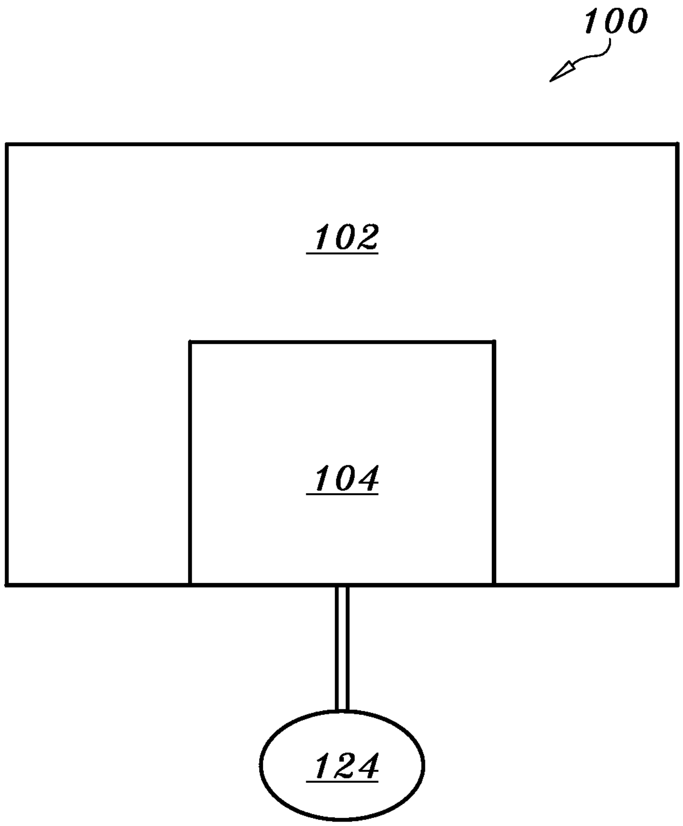
FIGS. 1A-1D show a system in accordance with one embodiment.
Figure 1B:
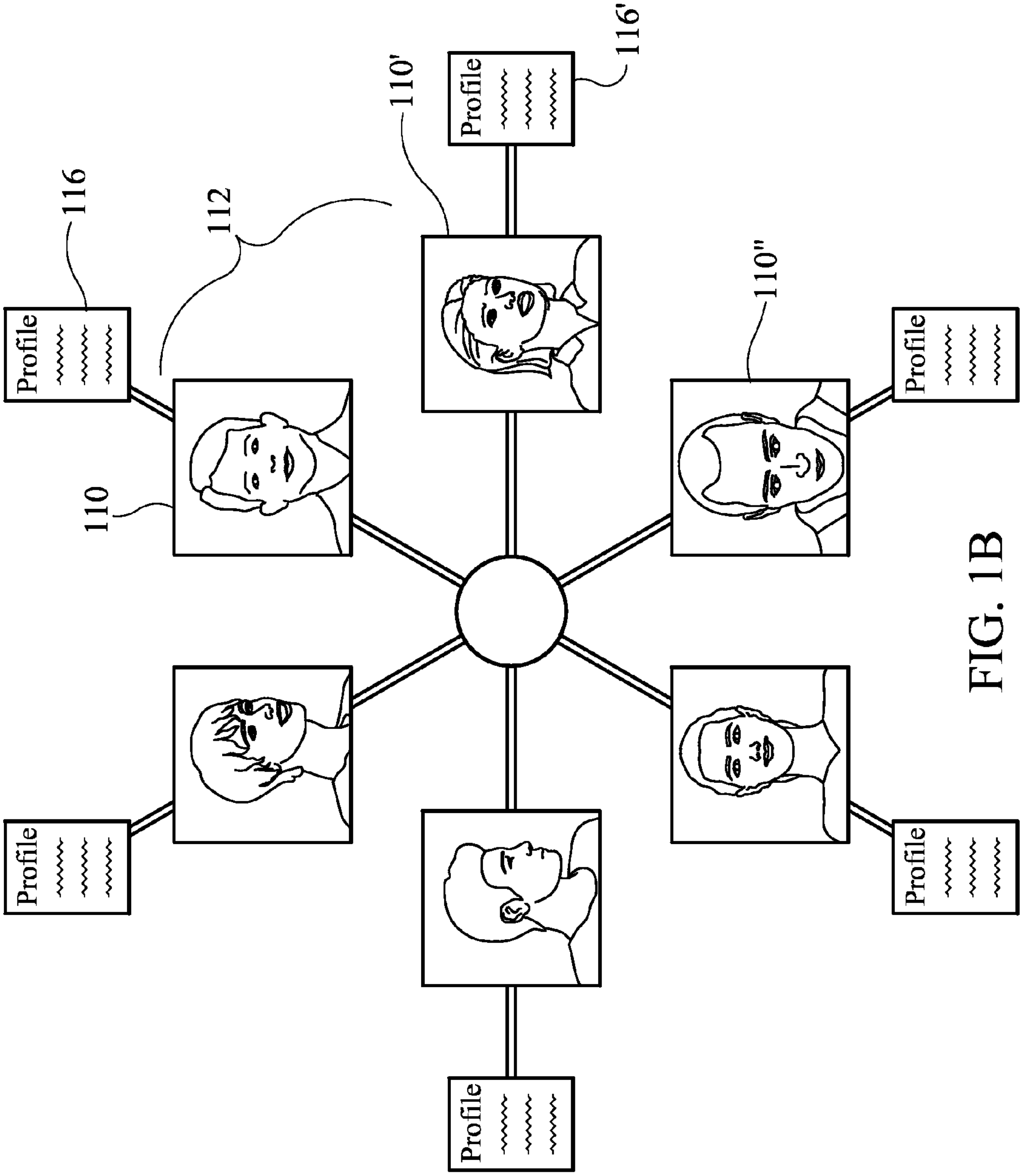
Figure 1C:
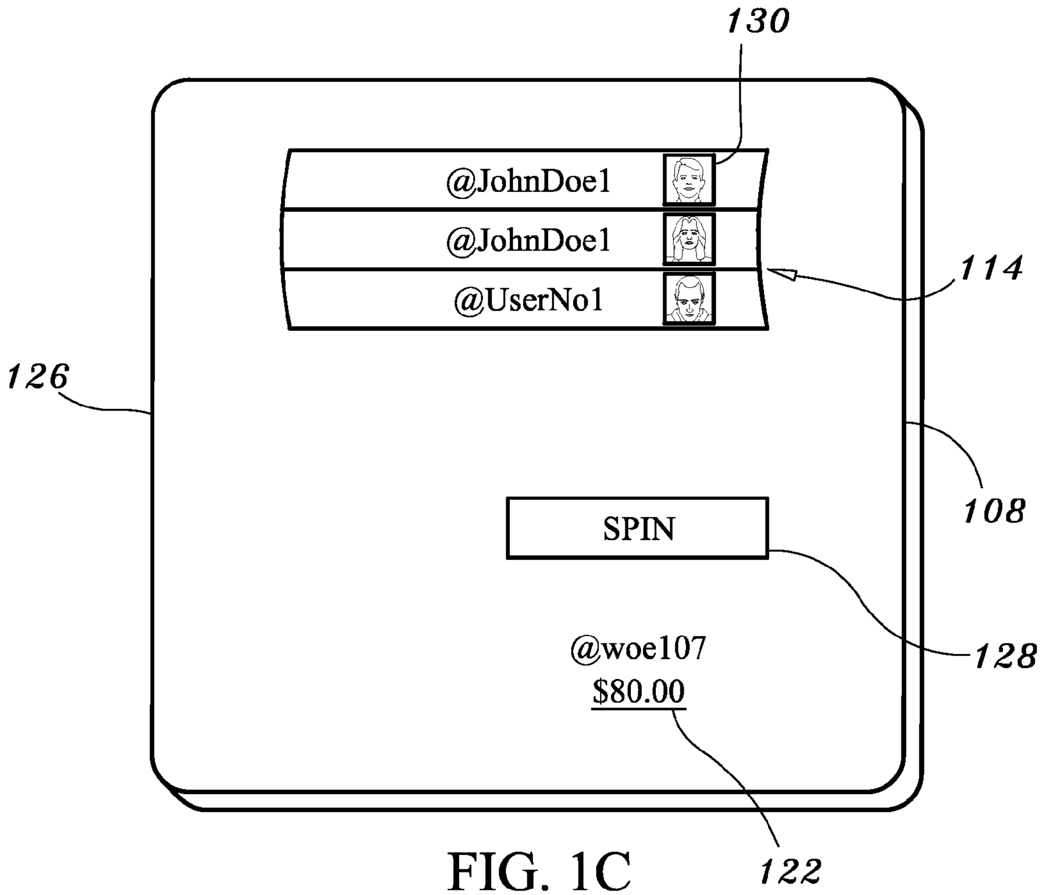
Figure 1D:
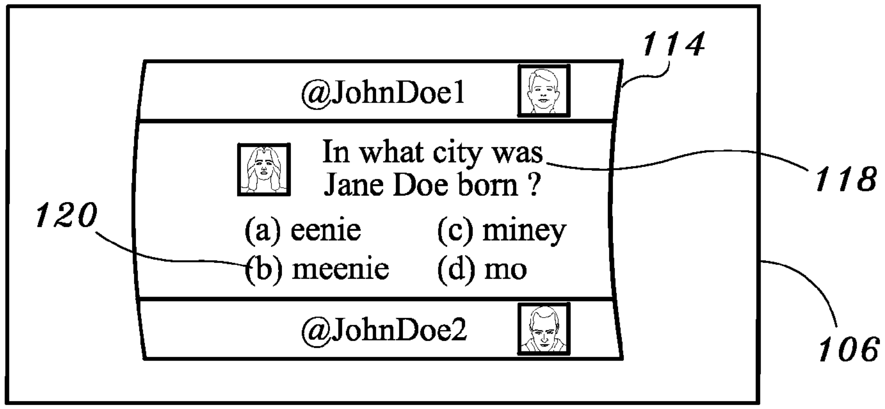

FIGS. 1A-1D show a system 100 in accordance with one embodiment. System 100 comprises of at least one processor 102 and computer executable instruction code 104 readable and executable by the at least one processor 102 and configured for displaying at least one electronic game 106 on a display device 108, wherein game 106 comprises of: computer executable instruction code 104 readable and executable by the at least one processor 102 and configured for receiving instructions to initiate the at least one game 106; randomly selecting a predefined sampling of friends 110, 110' from at least one online social networking contacts 112 to participate in the game 106 from one or a plurality of online social networking sites; displaying the predefined sampling of friends 110, 110' in a dynamic arrangement 114, e.g. on a virtual wheel barrel 114; randomly selecting at least one of the sampling of friends 110, 110'; animating the dynamic arrangement 114, e.g. on a virtual wheel barrel 114, for selecting at least one friend 110 of the predefined sampling of friends 110, 110'; reviewing a profile 116 of the selected at least one friend 110; generating a random question 118 based on the at least one friend's profile 116; displaying the random question 118 for a response 120; requiring that the response 120 be submitted for the random question 118; receiving the response 120 to the random question 118; awarding virtual currency 122 to the gamer based on the gamer's response 120 to the random question 118; and deducting or crediting virtual currency 122 to the gamer for incorrectly or correctly answering the random question 118.

In some embodiments, processor 102 may be any type of processor, and may reside in a client computer, such as a PC, laptop, smart phone, tablet PC, iPad, notebooks, net books, and the like, a server computer, or on a cloud computer.

In some embodiments, display device 108 comprises of any type of display device, such as a client display device, which may be part of a PC, laptop, tablet PC, smartphone, and the like.

In some embodiments, the display device 108 and processor 102 may be electronically connected directly, such as by local wireless or wired means, such as WLAN, Bluetooth™, USB™, Display Port, HDMI™, and the like. In an alternate embodiment, processor 102 may be indirectly or remotely electronically connected, such as through a computer network, such as the Internet. In some embodiments, the terms "electronically connected" refer to any type of electronic connection, whether physical or wireless, which allows for the transmission of electrical signals.

Computer executable instruction code 104 may be any type of computer executable instruction code 104, which may be in the form of a computer program, the program being composed in any suitable programming language or source code, such as C++, C, JAVA, JavaScript, HTML, XML, and other programming languages. Computer executable instruction code 104 may be loaded directly on the server's processor 102, or its storage means 124.

Storage means 124 may comprise of a storage device and may include memory, such as, but is not limited to, read-only memory, such as CD-ROMs, DVDs, floppy disks, and the like, read and write memory, such as a hard drive, floppy disc, CD-R, CD-RW, DVD-ROM, DVD-R, DVD-RW, solid state memory, such as solid state hard drives, flash memory, and the like, and random access memory. Storage means 124 may be used to store information, such as virtual currency 122 allocated to a particular gamer, deductions, credits, game history, information pertaining to gamer's profile, friend's profile 116, response 120, correct responses 120, 120' and the like.

Computer executable instruction code 104 is configured to perform any and all of the functions stated herein. Specifically, computer executable instruction code 104 is configured to perform any one or more of the following: displaying at least one game 106 on a display device 108; receiving instructions to initiate the at least one game 106; randomly selecting a predefined sampling of friends 110, 110' from at least one online social networking contacts 112 to participate in the game 106 from one or a plurality of online social networking sites; displaying the predefined sampling of friends 110, 110' on a virtual wheel barrel 114; randomly selecting at least one of the sampling of friends 110, 110'; animating the virtual wheel barrel 114, for selecting at least one friend 110 of the predefined sampling of friends 110, 110'; reviewing a profile 116 of the selected at least one friend 110; generating a random question 118 based on the at least one friend's profile 116; displaying the random question 118 for a response 120; requiring that the response 120 be submitted for the random question 118; receiving the response 120 to the random question 118; awarding virtual currency 122 to the gamer based on the gamer's response 120 to the random question 118; and deducting or crediting virtual currency 122 to the gamer for incorrectly or correctly answering the random question 118.

The term "friends" 110, 110' as used herein may refer to any type of online social networking contacts 112, invited or accepted, such as friends, families, acquaintances, business connections, and even new friends or strangers. In one embodiment, game 106 may access one or a plurality of websites, e.g. FACEBOOK and JUSTSYNC™, for which gamer has registered online social networking contacts 112, 112' to determine and obtain the random sampling of friends 110, 110' for participation in the game 106 by a review of the online social networking contacts' profiles 116, 116'.

"Virtual currency" 122 as used herein refers to virtual money in any country's designated denomination, e.g. pounds, euro, dollars, and the like, earned as a reward for gamers' correct responses 120, 120' (answers) wherein each response 120 is assigned a negative or positive value in virtual currency 122 and gamers' responses 120, 120' are each aggregated for a total sum. Accordingly, if gamer responds correctly to a question 118, gamer's total virtual currency 122 will be credited with a positive value in virtual currency 122, while an incorrect response causes a deduction for wrong answers. Gamer's incentive for earning virtual currency 122 may include bragging rights among gamer's friends 110, 110' for having earned the largest sum of virtual currency 122.

In some embodiments, each question 118 has the identical positive or negative value of virtual currency 122 awarded to the gamer for correct/incorrect responses, respectively.

In some embodiments, gamer maybe credited with higher virtual currency 122 for correct responses 120, 120' and a lesser sum deducted for incorrect responses 120,120' to encouraging gaming.

In yet another embodiment, different questions 118, 118' or game levels may be credited with higher virtual currency 122 for correct responses 120, 120' than others.

In some embodiments, the virtual currency 122 is assigned for a limited predetermined term before it is zeroed out and set to zero for the beginning of a new term. For example, the predetermined length of time may comprise of 1, 3 or 6 months, 7 days, 14 days or any variations thereof. Once the predetermined term is completed, the virtual currency 122 is zeroed out and gamer must play to start earning virtual currency 122 for the new term.

In some embodiments, friends 110, 110' may be displayed in a dynamic arrangement, such as a virtual wheel barrel 114, a rotating circumferential arrangement, a dynamic matrix, which may be of any shape or size, a pop-up arrangement, or any other type of moving/dynamic graphical presentation.

In some embodiments, the gamer may use an input device 126 to respond to the question 118 being asked during the game 106. Computer executable instruction code 104 is configured for receiving the response 120 to the random question from the input device 126 which may be any type of input device, such as, but not limited to, a touchscreen, a mouse, a stylus, a gesture recognition device, and the like.

In some embodiments, game 106 may comprise of a time restriction element or period, wherein gamer would be required to respond to the random question 118 before a particular period of time expires. The period of time may vary according to the level of difficulty of the game 106, which may also vary according to gamer's progress.

In some embodiments, gamer may activate the game 106, which comprises of computer executable instruction code 104, by selecting a virtual button 128, e.g. a radio button 128 marked "PLAY" or "SPIN" so that the selection process for at least one friend 110 of a random sampling of friends 110, 110' from a gamer's online social networking contacts 112, 112' can be selected, and for whom a random question 118 can be generated based on the selected friend's profile 116.

Upon activation of the game 106, via its computer executable instruction code 104, the game 106 randomly selects a predefined sampling of friends 110, 110' from the gamer's online social networking contacts 112, 112' from which a particular friend 110 will be selected for a review of his/her profile 116. The predefined sampling of friends 110, 110' may comprise of a set programmable number, e.g. 5, 10, 15, 25, or 30, and the like, coded within the game's computer executable instruction code 104. In some embodiments, gamer may need their friends' 110, 110' permissions for their profile 116 to be included in the game 106, while in other embodiments, because the friends' 110, 110' are unaware that they are being randomly selected for the game 106, no express permission is required. It is understood that gamers lacking the minimum number of online social networking contacts 112, 112' required for the predefined sampling of friends 110, 110' in their online social networking contacts 112, 112' either from a singular or a plurality of online social networking websites may not be able to participate in the game 106. It is also understood that the larger the population of gamer's online social networking contacts 112, 112', the greater the chances are that the randomly selected at least one of the sampling of friends 110, 110' from his/her online social networking contacts 112, 112' will be not selected more than once for participation in the game 106.

Computer executable instruction code 104 is configured to display the predefined sampling of friends 110, 110' in a dynamic arrangement 114, e.g. a virtual wheel barrel, a rotating circumferential arrangement, a dynamic matrix, or a pop-up arrangement and the like. Once the predefined sampling of friends 110, 110' are randomly selected, the computer executable instruction code 104 further animates the dynamic arrangement 114 for display. In the preferred embodiment, the computer executable instruction code 104 animates the virtual wheel barrel 114 to rotate the virtual wheel barrel 114 and select at least one friend's profile 116 from the random sampling of friends 110, 110' about whom a random question 118 will be generated. Computer executable instruction code 104 is configured for reviewing the selected at least one friend's profile 116 and generating a random question 118 for display based on the at least one friend's profile 116. The random question 118 may be displayed in any one or more formats: multiple choice, fill in, audio, text, or graphical format, and the like. Similarly, the response 120 may be inputted in like formats, i.e. multiple choice, fill in the blanks, audio, text, or graphical format and the like and is dependent on the format of the question 118 presented. The question 118 may inquire for instance "What city was Jane Doe born?" or "Name the High School Jane Doe attended?

Computer executable instruction code 104 is coded to display the random question 118 for which a response 120 will be required. In some embodiments other related images 130, 130', e.g. the friend's profile picture or any other images 130", may be displayed in conjunction with the question 118 presented. In some embodiments, the question 118 is presented without any such display of other images 130, 130', which may increase the level of difficulty of the game 106.

To earn virtual currency 122, the game's computer executable instruction code 104 requires gamer to respond to the random question 118. Upon receipt of gamer's response 120, the computer executable instruction code 104 awards virtual currency 122 to the gamer based on the gamer's response 120 to the random question 118, e.g. deducting or crediting virtual currency 122 to the gamer for incorrectly or correctly answering the random question 118.

In some embodiments, a gamer of a social network may be able to play the game against another gamer of the social network, to see who knows their contacts better. Gamers may challenge each other electronically over the social network, and the results of the challenge/competition may be posted to the gamers profiles 116, 116'.

In another embodiment, if a gamer fails to provide an accurate response 120 to the question presented 118, the game 106 may give the gamer the option of removing the friend 110 from their online social networking contacts 112, 112'.

In yet another embodiment, gamer may select their own sampling of friends 110, 110' for whom they would like the game 106 to generate the random question 118.

Methods

Figure 2:
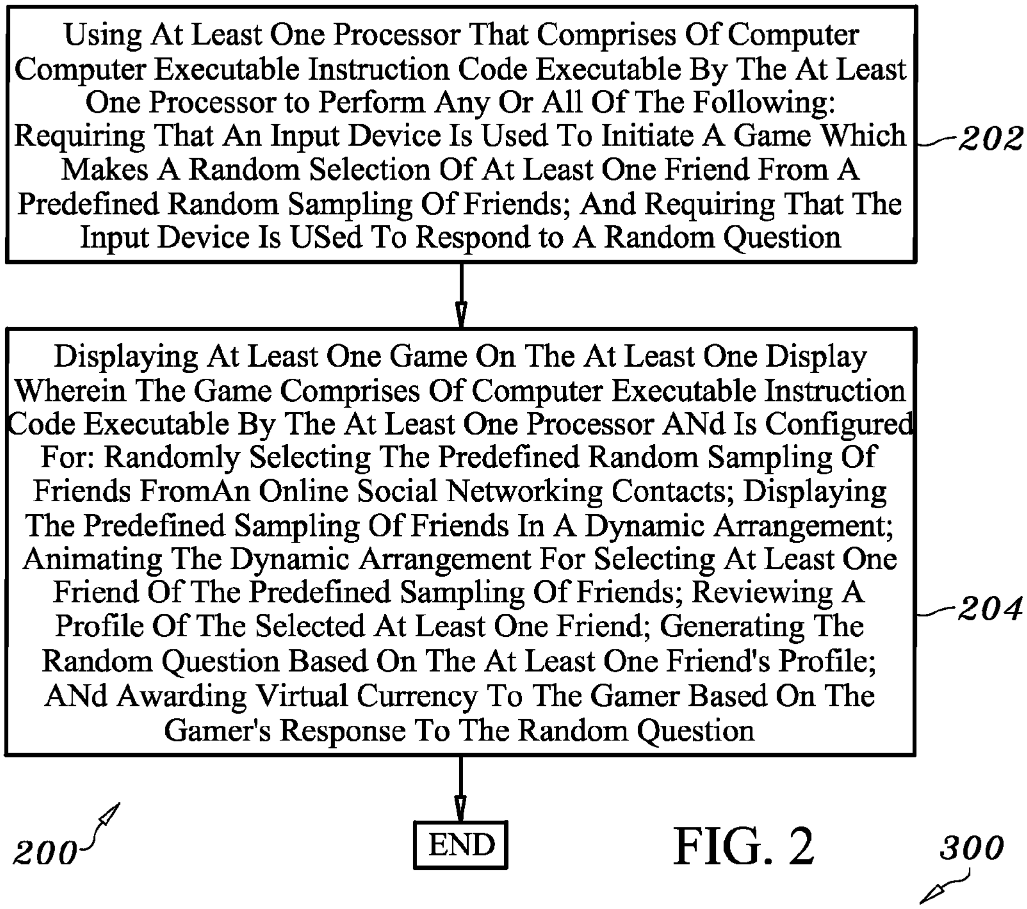
FIG. 2 shows a block diagram depicting a method in accordance with one embodiment.

Referring now to FIG. 2, a block diagram depicting a method 200 is shown in accordance with one embodiment, wherein method 200 comprises of using at least one processor 102 that comprises of computer executable instruction code 104 executable by the at least one processor 102 to perform any or all of the following: requiring that an input device 126 is used to initiate a game 106, which makes a random selection of at least one friend 110 from a predefined random sampling of friends 110, 110'; and requiring that the input device 126 is used to respond to a random question 120 (step 202).

As previously discussed, the at least one processor 102 may reside in a client computer, such as a PC, tablet, or mobile device, a server computer, such as a social networking host or online game host computer, or on a cloud computer. The at least one processor 102 may be any type of processor, such as those embodiments described above with reference to FIGS. 1A and 1B.

Similarly, the display device 108 may be any type of display device 108, such as a LCD screen, a LED screen, a projector, and the like, wherein the display device 108 may be connected to or part of a gamer device. In some embodiments, the display device 108 may be connected directly, such as by a physical wired connection or by being part of the same device, or the display device 108 may be connected indirectly to the processor 102, such as via computer network.

Method 200 further comprises of displaying at least one game 106 on at least one display device 108 wherein the game 106 comprises of computer executable instruction code 104 executable by the at least one processor and is configured for: randomly selecting the predefined sampling of friends 110, 110' from an online social networking contacts; displaying the predefined sampling of friends 110,110' in a dynamic arrangement 114; animating the dynamic arrangement 114 for selecting at least one friend 110, 110' of the predefined sampling of friends 110, 110'; reviewing a profile 116 of the selected at least one friend 110; generating the random question 120 based on the at least one friend's profile 116; requiring that a response 120 be submitted for the random question 118; and awarding virtual currency 122 to the gamer based on the gamer's response 120 to the random question 118 (step 204).

In some embodiments, the gamer must respond to the random question 118 concerning one of their friends 110 from their social online network contacts 112, 112', within a predetermined period of time, while in other embodiments, no time limitations are applied to gamer's response 120. It is understood, that once gamer responds to the random question 118, the gamer may play again by pressing e.g. the virtual play button 126, which may have any appropriate writings written thereon, e.g. "PLAY", "SPIN" and the like.

In another embodiment, allowing the gamer to move onto a next level if the gamer correctly identifies a set number of questions 118 consecutively. In other embodiments, the game's 106 difficulty might be increased by requiring the gamer to respond to the question 118 presented within a predetermined time. In the case that the questions 118 displayed are dynamic and may move faster at a higher game level.

In some embodiments, method 200 may comprise any or all of the steps carried out by the various embodiments of system 100 described above with reference to FIGS. 1A and 1B.

Figure 3:
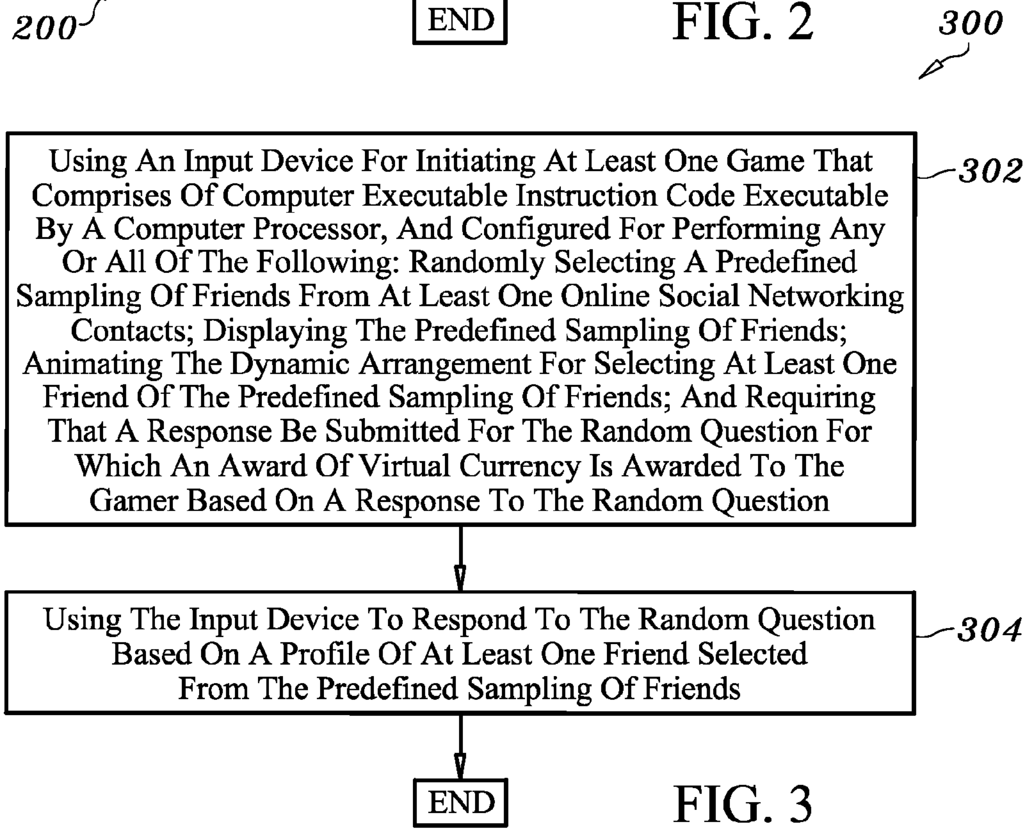
FIG. 3 shows a block diagram depicting a roulette game method in accordance with another embodiment.

FIG. 3 shows a block diagram depicting a roulette game method 300 in accordance with another embodiment. Method 300 comprises of using an input device 126 for initiating at least one game 106 wherein the game 106 comprises of computer executable instruction code 104 executable by a computer processor 102, and is configured for performing any one or all of the following: activating the game 106 upon receipt of instructions to initiate the at least one game 106 via a radio button 128, e.g. "PLAY" or "SPIN," in an exemplary embodiment; randomly selecting a predefined sampling of friends 110, 110' from at least one online social networking contacts; displaying the predefined sampling of friends 110, 110' in a dynamic arrangement 114; animating the dynamic arrangement 114 for selecting at least one friend 110 of the predefined sampling of friends 110, 110'; and requiring that a response 120 be submitted for the random question 118 for which an award of virtual currency 122 will be awarded to the gamer based on a response 120 to the random question 118 (step 302).

Method 300 further comprises of using the input device 126 to respond to the game's 106 random question 120 based on a profile 116 of at least one friend 10 selected from the predefined sampling of friends 110, 110' (step 304). The computer executable instruction code 104 receives the response 120 from the input device 126 and confirms whether the response 120 is correct or incorrect. Depending on whether the response 120 is correct or incorrect that will determine whether virtual currency 122 will be credited or debited to the gamer's virtual account.

As previously discussed, the dynamic arrangement 114 may include any one or more of the following: on a virtual wheel barrel, a rotating circumferential arrangement, a dynamic matrix, or a pop-up arrangement. As such, animating the dynamic arrangement 114 further comprises of animating the virtual wheel barrel 114 to virtually rotate and display the random question 120 generated concerning the selected at least one friend 110.

Figure 4:
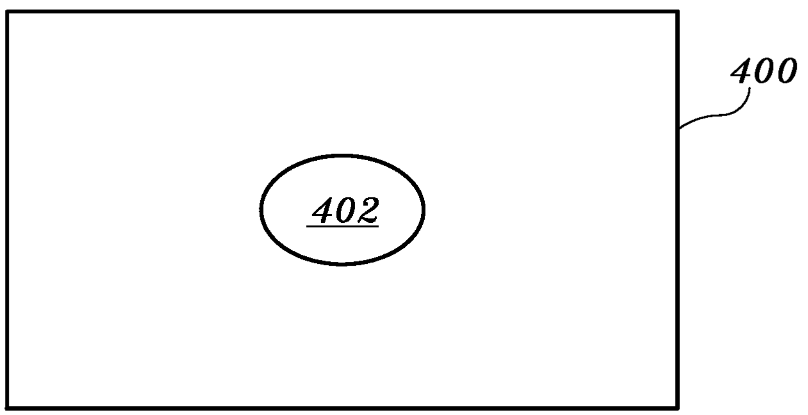
FIG. 4 shows a block diagram depicting a non-transitory computer readable medium in accordance with one embodiment.

Referring now to FIG. 4, a block diagram representing a non-transitory computer readable medium 400 is shown in accordance with one embodiment, wherein computer readable medium 400 may contain computer executable instruction code 402 configured for display at least one game on a display device, wherein the game comprises displaying a plurality of pictures of online social networking contacts and non-contacts, requiring that a gamer identify which pictures belong to contacts or non-contacts, and allowing the gamer to move onto a next level if the gamer correctly identifies which pictures belong to contacts or non-contacts.

In some embodiments, the computer executable instruction code may be configured for carry out any of the operations described above with regards to the various embodiments of system 100 and method 200 and FIGS. 1A through 3.

The non-transitory computer readable medium may comprise any type of non-transitory, non-signal computer readable medium, such as solid state computer storage, hard drives, CD-ROMs, DVDs, and the like. In another embodiment, the computer readable medium may comprise a transitory computer readable medium, such as a signal.

In the various embodiments of system and methods described herein, including system 100, method 200, and computer readable medium 400, the pictures of contacts or non-contacts may include or may be replaced with the names of those contacts or non-contacts.

Hardware and Operating Environment

This section provides an overview of exemplary hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
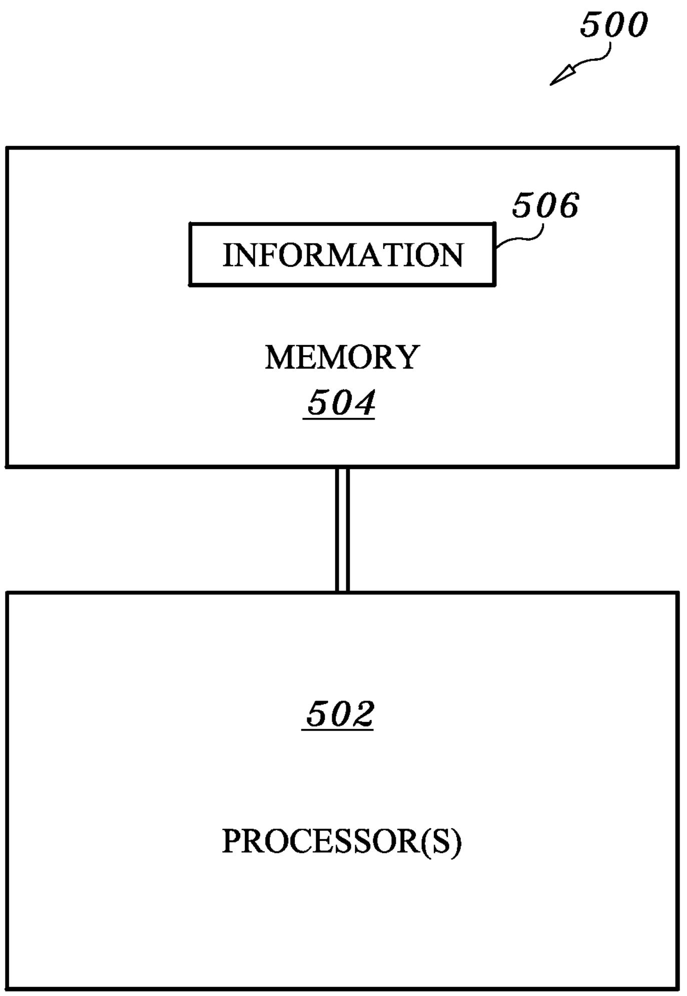
FIG. 5 shows a block diagram depicting an article in accordance with one embodiment.

FIG. 5 is a block diagram representing an article according to various embodiments. Such embodiments may comprise a computer, a memory system, a magnetic or optical disk, some other storage device, or any type of electronic device or system. The article 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 502) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

The invention claimed is:

1. A social networking roulette game system comprising:

a. at least one processor; and b. computer executable instruction code readable by the at least one processor and configured for displaying at least one game on a display device, wherein the game comprises of computer executable instruction code readable by the at least one processor and configured for:

i. randomly selecting a predefined sampling of friends from at least one online social networking contacts;

ii. displaying the predefined sampling of friends in a dynamic arrangement and randomly selecting at least one of the sampling of friends about whom a random question will be generated, which has no effect on another gamer's score;

iii. animating the dynamic arrangement for selecting at least one friend of the predefined sampling of friends;

iv. reviewing a profile of the selected at least one friend;

v. generating a random question based on the at least one friend's profile;

vi. requiring that a response be submitted for the random question; and vii. awarding virtual currency to the gamer based on the gamer's response to the random question.

2. The social networking roulette game system of claim 1, wherein the at least one processor resides in a client computer, server computer, or on a cloud computer.

3. The social networking roulette game system of claim 1, wherein the display device and at least one processor are electronically connected directly or indirectly.

4. The social networking roulette game system of claim 1, wherein the display device comprises at least one client display device.

5. The social networking roulette game system of claim 1, wherein the dynamic arrangement may include any one or more of the following: a virtual wheel barrel, a rotating circumferential arrangement, a dynamic matrix, or a pop-up arrangement.

6. The social networking roulette game system of claim 1, wherein animating the dynamic arrangement further comprises of animating the virtual wheel barrel to virtually rotate and display the random question generated concerning the selected at least one friend.

7. The social networking roulette game system of claim 6, wherein the computer executable instruction code readable by the at least one processor are further configured for displaying the random question in any one or more formats: multiple choice, fill in, audio, text, or graphical format.

8. The social networking roulette game system of claim 1, wherein the computer executable instruction code readable by the at least one processor are further configured for receiving the response to the random question.

9. The social networking roulette game system of claim 8, wherein the computer executable instruction code readable by the at least one processor are further configured for receiving the response to the random from an input device which may include any one of the following: a touchscreen, a mouse, a stylus, or a gesture recognition device.

10. The social networking roulette game system of claim 1, wherein the computer executable instruction code are further configured for deducting or crediting virtual currency to the gamer for incorrectly or correctly answering the random question.

11. A social networking roulette game method comprising of:

a. using at least one processor that comprises of computer executable instruction code executable by the at least one processor to perform any or all of the following:

i. requiring that an input device is used to initiate a game which makes a random selection of at least one friend from a predefined random sampling of friends; and ii. requiring that the input device is used to respond to a random question; and b. displaying at least one game on at least one display device wherein the game comprises of computer executable instruction code executable by the at least one processor and is configured for:

i. randomly selecting the predefined sampling of friends from an online social networking contacts;

ii. displaying the predefined sampling of friends in a dynamic arrangement and randomly selecting at least one of the sampling of friends about whom a random question will be generated, which has no effect on another gamer's score;

iii. animating the dynamic arrangement for selecting at least one friend of the predefined sampling of friends;

iv. reviewing a profile of the selected at least one friend;

v. generating the random question based on the at least one friend's profile;

vi. requiring that a response be submitted for the random question; and vii. awarding virtual currency to the gamer based on the gamer's response to the random question.

12. The social networking roulette game method of claim 11, wherein the at least one processor resides in a client computer, server computer, or on a cloud computer.

13. The social networking roulette game method of claim 11, wherein the display device and at least one processor are electronically connected directly or indirectly.

14. The social networking roulette game method of claim 11, wherein the display device comprises of at least one client display device.

15. The social networking roulette game method of claim 11, wherein the dynamic arrangement may include any one or more of the following: on a virtual wheel barrel, a rotating circumferential arrangement, a dynamic matrix, or a pop-up arrangement.

16. The social networking roulette game method of claim 11, wherein animating the dynamic arrangement further comprises of animating the virtual wheel barrel to virtually rotate and display the random question generated concerning the selected at least one friend.

17. The social networking roulette game method of claim 16, wherein the game further comprises of displaying the random question in any one or more formats: multiple choice, fill in, audio, text, or graphical format.

18. The social networking roulette game method of claim 11, wherein the computer executable instruction code readable by the at least one processor are further configured for receiving the response to the random question.

19. The social networking roulette game method of claim 11, wherein the input device may include any one of the following: a touchscreen, a mouse, a stylus, or a gesture recognition device.

20. The social networking roulette game method of claim 11, wherein the game further comprises of deducting or crediting virtual currency to the gamer for incorrectly or correctly answering the random question.

21. A roulette game method comprising of:

a. using an input device for initiating at least one game that comprises of computer executable instruction code executable by a computer processor, and configured for performing any one or all of the following:
   i. randomly selecting a predefined sampling of friends from at least one online social networking contacts;
   ii. displaying the predefined sampling of friends in a dynamic arrangement and randomly selecting at least one of the sampling of friends about whom a random question will be generated, which has no effect on another gamer's score;
   iii. animating the dynamic arrangement for selecting at least one friend of the predefined sampling of friends; and
   iv. requiring that a response be submitted for the random question for which an award of virtual currency is awarded to the gamer based on a response to the random question; and b. using the input device to respond to the random question based on a profile of at least one friend selected from the predefined sampling of friends.

22. The roulette game method of claim 21, wherein the dynamic arrangement may include any one or more of the following: on a virtual wheel barrel, a rotating circumferential arrangement, a dynamic matrix, or a pop-up arrangement.

23. The roulette game method of claim 21, wherein animating the dynamic arrangement further comprises of animating the virtual wheel barrel to virtually rotate and display the random question generated concerning the selected at least one friend.

* * * * *